Jan. 12, 1960 A. HOPENGARTEN ET AL 2,921,230
HORIZONTAL DEFLECTION SYSTEM FOR CATHODE RAY TUBES
Filed Jan. 2, 1957
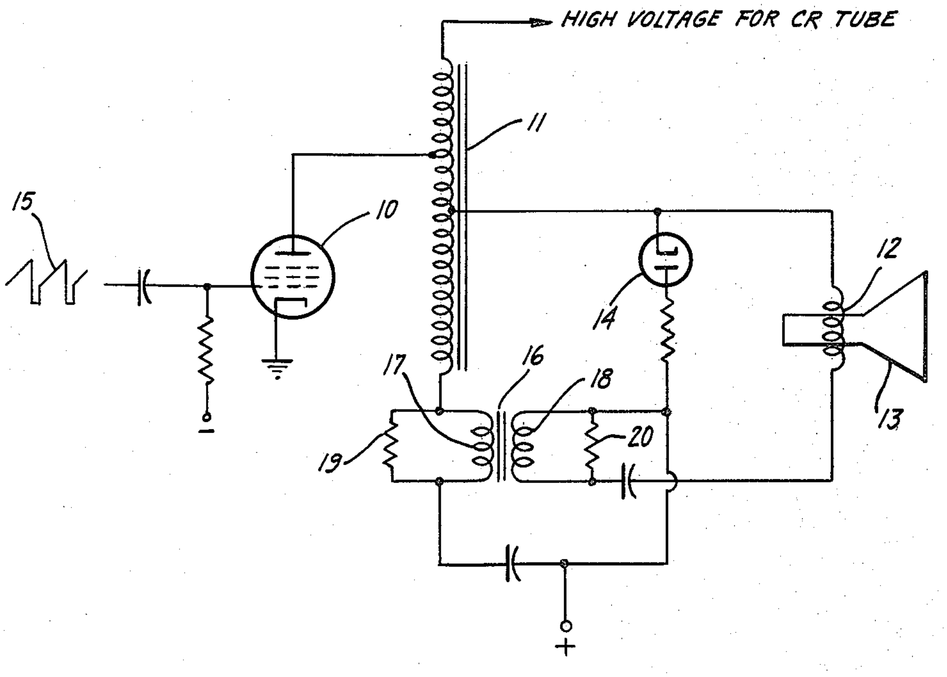
INVENTORS
ABRAM HOPENGARTEN
PAUL G. WOLFE
ROBERT C. MOORE
BY [signature]
ATTORNEY United States Patent Office 2,921,230

Patented Jan. 12, 1960

2,921,230

HORIZONTAL DEFLECTION SYSTEM FOR CATHODE RAY TUBES

Abram Hopengarten, Philadelphia, Paul G. Wolfe, Oreland, and Robert C. Moore, Huntingdon Valley, Pa., assignors to Philco Corporation, Philadelphia, Pa., a corporation of Pennsylvania Application January 2, 1957, Serial No. 632,099

3 Claims. (Cl. 315—27)

This invention relates to horizontal deflection systems for cathode ray tubes, and more particularly to the elimination or minimization of ringing currents in such systems.

The invention is particularly applicable to the horizontal deflection system of a television receiver, and therefore it will be described with particular reference to such application.

The horizontal magnetic deflection system now commonly employed in television receivers includes an output or driver tube, an output transformer, a magnetic deflection yoke whose horizontal deflection coils are connected to the transformer, and a damper tube also connected to the transformer in cooperative association with the horizontal deflection coils. Usually, the transformer is an auto-transformer, and high voltage for the second anode of the cathode ray tube is derived therefrom. A signal of suitable form is supplied to the driver tube which conducts during approximately the whole of the trace interval and is cut off during the retrace interval. Upon cutoff of the driver tube, the energy in the yoke is transferred to the transformer.

As is will known, the mode of operation and the oscillatory character of the deflection system cause undesired transient oscillations, giving rise to so-called ringing currents which tend to persist through the trace interval and tend to produce noticeable visual effects in the image. Furthermore, while it is economically advantageous to derive high voltage from the deflection system for application to the second anode of the cathode ray tube, in such a system the ringing currents are more pronounced and more troublesome.

Various proposals have been made in the past for the elimination or minimization of ringing current. These have generally been directed toward dissipation or damping of the ringing current or diversion thereof away from the deflection coils. Such proposals have not been adequate in practice to provide a wholly satisfactory solution of the problem.

In a copending application of P. G. Wolfe, Serial No. 547,407, filed November 17, 1955, now Patent No. 2,809,327, a different approach to the problem is described. It having been determined that ringing current originates in the output transformer, Wolfe discovered that the ringing voltage goes through a null point on the transformer, and that the transformer could be effectively isolated from the horizontal deflection coils, as far as the ringing voltage is concerned, by connecting the coils to a preestablished null point on the transformer.

In a copending application of R. C. Moore, Serial No. 632,100, filed January 2, 1957, there is disclosed a different novel concept based upon a different approach to the same problem. Such concept involves the production of a voltage which effectively counteracts the voltage across the damper tube produced by ringing current, so that little or no ringing voltage is produced across the deflection coils and consequently little or no ringing current flows in the coils.

The present invention has for its principal object the provision of an improved and preferred embodiment of the generic invention disclosed and claimed in the Moore application.

The invention may be fully understood from the following detailed description with reference to the accompanying drawing, wherein the single figure is a schematic illustration of the pertinent portion of a horizontal deflection system embodying the present invention.

Referring more particularly to the drawing, there is shown the pertinent portion of a horizontal deflection system comprising an output or driver tube 10, an output transformer 11 which is preferably an autotransformer as shown, a deflecting yoke which includes the horizontal deflection coils, represented at 12, associated with the cathode ray tube 13, and a damper tube 14 which is preferably a diode. These elements may be connected as shown, the horizontal deflection coils being connected to the transformer to receive deflection current, and the damper tube 14 also being connected to the transformer.

As thus far described, the system is conventional and its operation is well understood. A signal, such as represented at 15, is supplied to the control grid of the driver tube 10, and the latter serves as a switch to control the supply of energy to the horizontal deflection coils 12 through the transformer 11. In a system of this character, ringing current flows from the transformer through the damper tube, and this current produces a voltage variation across the horizontal deflection coils during the scan or trace interval, which produces a ringing current in the deflection coils. This invention is directed to the elimination or minimization of ringing current in the deflection coils.

In accordance with this invention, a voltage is produced which is effective substantially to counteract the ringing voltage drop across the damper tube, thereby substantially to prevent the existence of ringing voltage across the deflection coils. More particularly, the counteracting voltage is applied between the damper tube and the low potential end of the horizontal deflection coils. This voltage is preferably produced by means of a small transformer 16 having a primary winding 17 connected to the low potential end of the winding of transformer 11, and having a secondary winding 18 serially connected between the damper tube 14 and the low potential end of the horizontal deflection coils 12.

With this arrangement, ringing current flowing in the primary of the transformer 16 produces a voltage across secondary 18 in proper polarity to oppose the ringing voltage drop across the damper tube. The voltage across secondary 18 effectively boosts the voltage at the normally low potential end of the deflecting coils 12. With proper choice of ratio of transformer 16, the boosting voltage effectively counteracts the ringing voltage drop across the damper tube and causes both ends of the deflecting coils to be of substantially the same potential with respect to ground at the ringing frequency. However, this condition cannot exist exactly during the entire scan interval because of the change in damper tube reistance between its low value when it conducts heavily at the start of the scan and its higher value when it conducts less heavily at the end of the scan.

To overcome this objection, the voltage across secondary 18 may be made to match the ringing voltage drop across the damper tube during part of the scan, and provision may be made for damping the ringing current during another part of the scan. Preferably, the voltage across the secondary 18 is made to match the ringing voltage drop across the damper tube at the start of the scan, and provision is made for damping the ringing current during the latter part of the scan. To this end, the transformer 16 is made self-resonant at the ringing frequency and its windings are shunted by resistances 19 and 20. Consequently, its losses are great enough to end the ringing while the damper tube is conducting relatively heavily.

From the foregoing description, it will be seen that this invention is novelly characterized in that it produces, in response to ringing current, a voltage which is applied between the damper tube and the low potential end of the horizontal deflection coils so as to counteract the voltage drop across the damper tube due to ringing current, thus causing both ends of the deflection coils to be at substantially the same potential with respect to ground at the ringing frequency so that little or no ringing current flows in the deflection coils.

While a preferred embodiment of the invention has been illustrated and described, it is to be understood that the invention is not limited thereto but contemplates such modifications and further embodiments as may occur to those skilled in the art.

We claim:

1. In a horizontal deflection system for a cathode ray tube having a deflection yoke including horizontal deflection coils, means including an output transformer connected to said coils for supplying deflection current to the coils, a damper tube connected to said transformer, there being ringing current flow from said transformer through said damper tube during at least part of the scan interval, which produces a voltage drop across the damper tube and thus tends to produce ringing current in said coils, the resistance of said damper tube varying during the scan interval, means for producing in response to the ringing current, between said damper tube and the normally low potential end of said coils, a voltage effective substantially to nullify or counteract said voltage drop during part of the scan interval, and means for damping the ringing current during another part of the scan interval, thereby substantially to prevent the presence of ringing voltages across said coils and thus prevent flow of ringing current therein.

2. In a horizontal deflection system for a cathode ray tube having a deflection yoke including horizontal deflection coils, means including an output transformer connected to said coils for supplying deflection current to the coils, a damper tube connected to said transformer, there being ringing current flow from said transformer through said damper tube during at least part of the scan interval, which produces a voltage drop across the damper tube and thus tends to produce ringing current in said coils, the resistance of said damper tube varying during the scan interval, a voltage-deriving transformer having a primary winding in series with said output transformer at the low potential end thereof, and having a secondary winding connected between said damper tube and the normally low potential end of said coils, whereby to produce across said secondary winding a voltage effective substantially to nullify or counteract said voltage drop during part of the scan interval, and a resistor connected in shunt relation with each of said windings for damping the ringing current during another part of the scan interval, thereby substantially to prevent the presence of ringing voltages across said coils and thus prevent flow of ringing current therein.

3. In a horizontal deflection system for a cathode ray tube having a deflection yoke including horizontal deflection coils, means including an output transformer connected to said coils for supplying deflection current to the coils, a damper tube connected to said transformer, there being ringing current flow from said transformer through said damper tube during at least part of the scan interval, which produces a voltage drop across the damper tube and thus tends to produce ringing current in said coils, and transformer means for producing in response to the ringing current, between said damper tube and the normally low potential end of said coils, a voltage effective substantially to nullify or counteract said voltage drop, thereby substantially to prevent the presence of ringing voltages across said coils and thus prevent flow of ringing current therein, said transformer means comprising a primary winding connected to the low potential end of said output transformer, and a secondary winding connected between said damper tube and the low potential end of said coils, said windings having a turns ratio such that the voltage across said secondary winding substantially counteracts said voltage drop across said damper tube.

References Cited in the file of this patent

UNITED STATES PATENTS

| | | |
|---|---|---|
| 2,693,549 | Vonderschmitt | Nov. 2, 1954 |
| 2,743,381 | Dietch | Apr. 24, 1956 |
| 2,784,344 | Vonderschmitt | Mar. 5, 1957 |
| 2,792,523 | Bendell | May 14, 1957 |
| 2,814,759 | Vonderschmitt | Nov. 26, 1957 |
| 2,825,849 | Lufkin | Mar. 4, 1958 |
| 2,825,850 | Iden | Mar. 4, 1958 |
| 2,834,913 | Dietch | May 13, 1958 |